INVENTORS.
Curtis E. Maier
Jay D. Green

May 11, 1948.  C. E. MAIER ET AL  2,441,202
PURIFIED PLASTICIZED WAX AND PROCESS OF PREPARING THE SAME
Filed Feb. 12, 1945  3 Sheets-Sheet 3
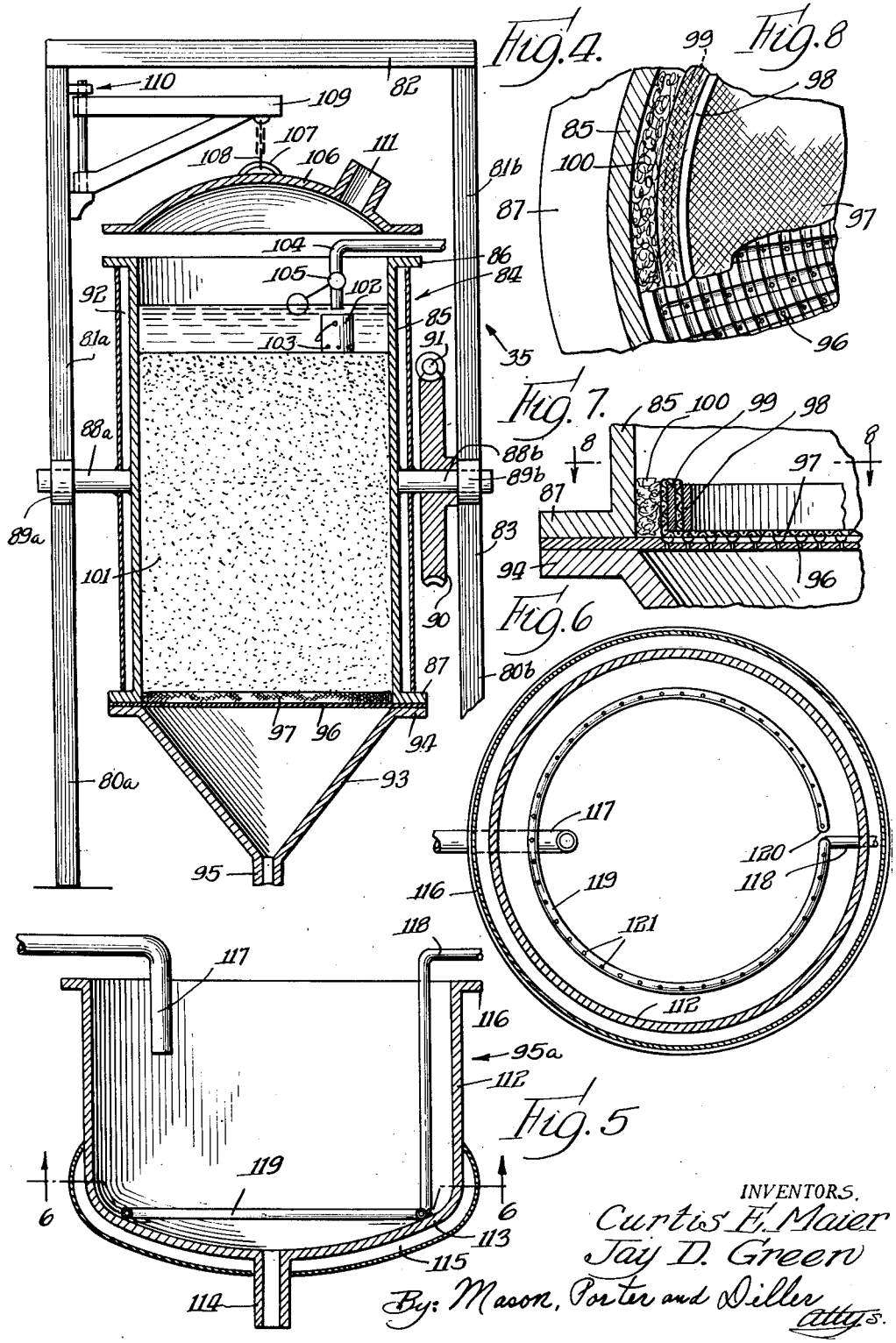
INVENTORS,
Curtis E. Maier
Jay D. Green
By: Mason, Porter and Diller  Attys.

Patented May 11, 1948

2,441,202

UNITED STATES PATENT OFFICE 2,441,202

PURIFIED PLASTICIZED WAX AND PROCESS OF PREPARING THE SAME

Curtis E. Maier, Elmhurst, and Jay D. Green, Chicago, Ill., assignors to Continental Can Company, Incorporated, New York, N. Y., a corporation of New York Application February 12, 1945, Serial No. 577,486

8 Claims. (Cl. 196—21)

This invention relates to the refining and improving of dark colored microcrystalline petroleum hydrocarbon wax. More particularly it relates to a method for removing flavor, odor and color components from such wax and to the resulting product.

Crude microcrystalline petroleum hydrocarbon wax compositions depending on their source and previous treatment will have some or all of the following types of odors and flavors; petroleum type odors and flavors, solvent type odors and flavors, oily or waxy odors and flavors, bitter odors and flavors characteristic of oxidation products in the wax compositions and particularly odors and flavors typical of the various types of solvents, such as methyl ethyl ketone, ethylene dichloride, etc., that are employed to separate fractions according to melting point by the fractional crystallization processes commonly used. These wax compositions are also very dark in color, having an NPA color rating of more than 8. They are further characterized by variations in plasticity, oil content, and ASTM melting point. Moreover, two compositions having the same ASTM melting point may differ greatly as respects the amounts of various fractions obtained when they are subdivided into fractions of narrower melting point range.

Clay filtration of these crude, dark colored, microcrystalline petroleum hydrocarbon waxes, as is well known in the art, is effective in decreasing their color and the extent to which the color is decreased is dependent upon the ratio of the clay to the wax, and the time and temperature of contact. Clay filtration is also capable of removing odors and flavors of most of the types mentioned above as being present in the crude waxes, the extent of the removal depending on the same factors which govern color removal but this treatment is rarely, if ever, effective in removing residual solvent type odors and flavors and in all cases imparts an "earthy" or "moldy" type flavor to the wax, the intensity of which increases with the extent of the removal of the colors, odors, and flavors, originally present. Thus, increasing the ratio of clay to wax to effect a greater decrease in color also results in an increase in the amount of moldy or earthy flavor acquired by the wax. Furthermore when more efficient removal of color is attained by a longer time of contact or a higher temperature of contact, in addition to an increase in the amount of earthy or moldy flavor imparted to the wax, the increased activity of the clay also increases the amount of petroleum type solvent odors and flavors acquired by the wax as a result of the breaking down of the lower molecular weight constituents of the wax composition. While bubbling steam thru clay filtered wax is often effective in removing some of the volatile materials imparting odor and flavor it does not remove the earthy or moldy type of flavor acquired by the wax while in contact with the clay.

Bone black filtering treatment is also well known in the art but is rarely practiced in removing the color, odor and flavor from these microcrystalline waxes because of its much greater cost per pound and its much lower efficiency, on a weight basis, in removing color. The bone black becomes exhausted after a relatively small amount of wax has been filtered thru it so that a high ratio of bone black to wax must be used to attain the same degree of color removal as can be attained by an appreciably lower ratio of the very much cheaper clay to wax with the result that bone black filtering is very expensive. Furthermore, such bone black filtering produces material imparting petroleum type solvent odors and flavors to the wax due to the great activity of the bone black. While this material imparting petroleum type solvent odors and flavors can be removed from the wax by bubbling steam thru it, the resulting bone black treated and steamed product still contains certain constituents which under conditions such as those encountered during application of the wax to foodstuff containers (temperatures of 200° F. to 250° F. and extensive contact with air) are oxidized to materials imparting objectionable odors and flavors to flavor sensitive foodstuffs. As a result, after a period of use in the applying machine such wax is no better than it was originally before bone black treatment and steaming. Furthermore, the steaming does not aid in eliminating the above mentioned inefficiency of the bone black for removing color, odor and flavor.

Finally, therefore, even after filtration thru clay or active carbon and subsequent steaming the resulting product still contains appreciable amounts of material imparting off-flavors and -odors. In addition it is subject to marked deterioration in flavor characteristics during application to food containers as a result of air oxidation.

It is an object of the present invention to provide an odor and flavor free microcrystalline petroleum hydrocarbon wax composition having substantially no acid number and saponification value and an NPA color greater than 1 and which even when aerated at temperatures from about 50° F. to about 100° F. above its ASTM melting point for periods upwards of 240 hours remains odor and flavor free.

A further object is to provide an odor and flavor free microcrystalline petroleum hydrocarbon wax composition adapted to be used in the manufacture of containers and wrapping material of paper, metal and the like used in packaging odor and flavor sensitive products and to provide containers and wrapping material manufactured with such wax compositions which wax composition is flexible in thin films at ordinary temperature, has substantially no acid number and saponification value and an NPA color greater than 1 and which, even when aerated at temperatures of from about 50° F. to about 100° F. above its ASTM melting point for periods upwards of 240 hours, remain odor and flavor free.

A still further object is to provide odor and flavor free microcrystalline petroleum hydrocarbon wax compositions adapted to be used in the manufacture of containers and wrapping material of paper, metal and the like used in packaging odor and flavor sensitive products which are processed at various temperatures from about 212° F. up to about 250° F., such as meat, fish, vegetables, fruit, fruit juices and the like, and to provide containers and wrapping material manufactured with such wax compositions, which wax compositions have substantially no acid number and saponification value and an NPA color greater than 1, are capable of withstanding various temperatures from about 212° F. to about 250° F. during sterilization of such products, are flexible in thin films at temperatures at which said products are ordinarily stored in containers and wrapping materials which even when aerated at temperatures of from about 50° F. to about 100° F. alone their ASTM melting points for periods upwards of 240 hours remain odor and flavor free.

Still another object is to provide odor and flavor free microcrystalline petroleum hydrocarbon wax compositions adapted to be used in the manufacture of containers and wrapping material to provide containers, particularly metal beer cans, lined or coated with such compositions used in packaging odor and flavor sensitive products which are pasteurized at various temperatures from about 140° F. to 150° F. up to 180° F. such as fruit, fruit juices, beer, milk and the like and to provide containers, and wrapping material, particularly metal beer cans, manufactured with such wax compositions, which wax compositions have substantially no acid number and saponification value and an NPA color greater than 1, are capable of withstanding various temperatures from 150° F. to 180° F. during pasteurization of such foods, are flexible in thin films at 32° F. and even when aerated at temperatures of from about 50° F. to about 100° F. above their ASMT melting points for periods upwards of 240 hours remain odor and flavor free.

A still further object is to provide an odor and flavor free microcrystalline petroleum hydrocarbon wax composition adapted to be used in the manufacture of containers and wrapping material, in packaging odor and flavor sensitive products preserved by freezing and to provide containers and wrapping material manufactured with such a wax composition which wax composition has substantially no acid number and saponification value, has an NPA color greater than 1, withstands temperatures of 130° F. during packaging of such products, is flexible in thin films at 0° F. and even when aerated at temperatures from above 50° F. to about 100° F. alone its ASTM melting point for periods upwards of 240 hours remains odor and flavor free.

Other objects will appear hereinafter.

It has now been found that the foregoing objects are accomplished by treating with clay a microcrystalline petroleum hydrocarbon wax composition having substantially no acid number and saponification value, containing material imparting odor and flavor to flavor sensitive foodstuffs containing its natural dark coloring material, continuing the clay treatment until the color of the wax composition is reduced to an NPA value of at most about 4 to about 5, separating the clay and wax composition, thereafter treating the wax composition with active carbon and after separating the wax composition and the active carbon, steam distilling the wax composition to remove material imparting solvent type odors and flavors, the active carbon treatment being continued until, upon steam distilling, an odor and flavor free wax composition is obtained. In both the clay and the active carbon treatments the wax composition in a fluid state is contacted with the treating material advantageously by percolating the wax composition thru a bed of the treating material, and when the treatment is completed the wax composition and treating material are separated before further processing the wax composition.

Generically the objects of the invention are accomplished if at least a part of the wax composition is treated with the clay provided the wax composition treated with active carbon has the NPA color of at most from about 4 to about 5. Thus, when the wax composition, is percolated thru the clay, the filtration thru a particular body of clay may be continued beyond the point where the effluent from the clay filter has a color of from about 4 to about 5, for example, in some instances to a point where this effluent has a color of about 6 provided the blend of a wax obtained has the NPA color of at most about from 4 to about 5 or a part of the wax composition may be treated with the clay and thereafter blended with the remainder of the darker colored wax composition provided the part so treated with clay is large enough and is treated sufficiently to reduce its color to a point where the blend, for example, the wax composition to be treated with the active carbon has the NPA color of at most about 4 to about 5. While it is more advantageous economically to carry out the clay treatment and active carbon treatment as parts of the same operation in order to avoid the necessity for twice heating the wax to a temperature at which it is sufficiently fluid, it is within the scope of the invention to start with a wax composition such as those commercially available which are like those described above as starting materials except that they have already been treated with clay to reduce their color to an NPA value of at most from about 4 to about 5. In this latter case to complete the processing of the wax composition it is only necessary to treat with the active carbon and steam distill as described. Suitable clays for use in the clay treatment are those such as the processed and concentrated bauxite absorbent percolating clay, of so-called porous type, heretofore employed commercially to decolorize microcrystalline petroleum hydrocarbon wax compositions altho other equivalent clays may be used. Similarly, for the active carbon treatment any desired active form of carbon may be used altho it is preferable to use a bone black, which has a particle size such that not more than three-tenths of one percent passes thru a 100 mesh screen.

For many uses the properties of the microcrystalline petroleum wax compositions produced by the above described process can be improved by the addition of various materials including particularly resinous materials, petroleum hydrocarbon compositions melting below the wax composition, such as oils, petrolatums and even low melting point waxes. These added materials may be blended into the wax composition at any desired stage of the process subject to the qualification that in selecting the point at which to make the addition the character of the material to be added as respects color, odor and flavor should be borne in mind. Thus it is preferable to add such materials prior to the active carbon treatment to insure that the final product shall be odor and flavor free.

Flow sheets indicating procedure according to the present invention are shown in the figures, which also illustrate details of the equipment employed in the active carbon treatment.

Figure 4 is a view partly in vertical cross-section of the bone black percolator shown in the flow diagram of Figure 1.

Figure 5 is a view in vertical cross-section of a steaming tank shown in the flow diagram of Figure 1.

Figure 6 is a view in section on the line 6—6 in Figure 5.

Figure 7 is an enlargement of a portion of the view shown in Figure 5 showing details of the filter cloth assembly.

Figure 8 is a view partly in section on the line 8—8 in Figure 7.

Figure 1:
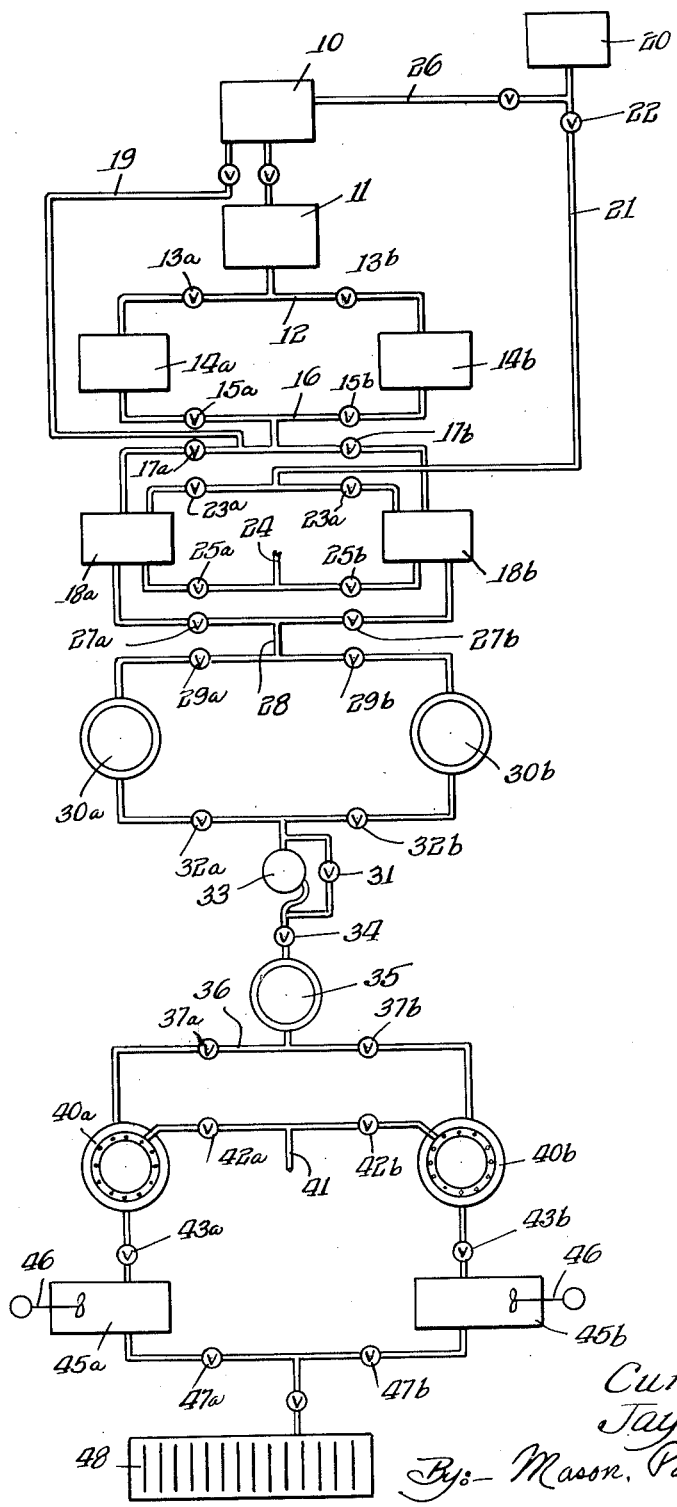
Figure 1 is a flow diagram illustrating a preferred arrangement for carrying out the process of this invention in which a separate chamber is provided for the active carbon treatment.

In the flow sheet of Figure 1 is shown a convenient arrangement for plasticizing and refining a wax composition involving successive filtration of the wax composition through clay and bone black, followed by steaming. The refining steps cooperate to eliminate from the wax composition material imparting odor and flavor to flavor sensitive foods and other products.

A wax melting and holding tank 10, equipped with steam heating and air agitating coils, is provided to receive the black microcrystalline petroleum hydrocarbon wax composition to be refined. After the wax is heated in tank 10 to the desired percolating temperature it is passed through a vessel 11 having a layer of decolorizing filtering clay therein, through which the wax composition is percolated and the wax composition after its color has been reduced by such percolation is brought into a discharge conduit 12. It is there passed through valve 13a or 13b into the color-blending and receiving tanks 14a, 14b, which are bottom steam jacketed and are provided with mechanical agitators. As the wax composition continues to flow through the clay, the originally bright color becomes darker, and hence the run is collected in a receiving tank 14a, 14b, until the blended color is that which is desired, for example #3 or #4, NPA. When the run into one of the blending tanks 14a, 14b has been completed, the flow from the receptacle 10 is cut off, and the filtering tank 11 cleared and a new bed of filtering clay placed therein, whereupon the next run is directed into the other blending tank 14b, 14a.

The blended clay-filtered wax, in tank 14a for example, is passed through a discharge valve 15a to a common manifold 16 and then led through a valve 17a or 17b to a bottom steam jacketed holding tank 18a or 18b. When the wax composition starting material has previously been decolorized with clay to the desired color, the wax after it is melted in tank 10 is passed through valved by-pass line 19 directly to a holding tank 18a or 18b.

Frequently, it is desirable to plasticize the wax composition, particularly when it is to be employed for coating surfaces of metal or paper which are to form a part of a container for foodstuffs and such plasticization is conveniently accomplished at this point in some instances. Accordingly, a plasticizer, such as a white petrolatum, is provided in a bottom steam jacketed tank 20 and led through a pipe 21 melting and heating it so that the valve 22 and a selected valve 23a or 23b will cause a predetermined measured quantity of the petrolatum to flow into the selected tank 18a, 18b which is holding the molten and clay-filtered wax composition. A thorough agitation of the blend is accomplished, for example, by introducing air under pressure from a pipe 24 and through the selected valve 25a, 25b into the tank. It will be understood that normally these holding tanks 18a, 18b are of large capacity. A valved line 26 connecting tank 20 with tank 10 provides means for blending the plasticizer with the wax composition in tank 10 when it is desired to percolate the plasticizer thru the clay either with the initial wax composition or separately.

The plasticized wax composition can be withdrawn from the tanks 18a, 18b selectively by opening the valves 27a, 27b, whereupon the wax composition flows into a common manifold 28 and thence can move through the selective valves 29a, 29b into the bottom steam jacketed measuring tanks 30a, 30b, which have discharge valves 32a, 32b. When a measured quantity of the blended mixture has been gathered in one of these measuring tanks, for example tank 30a, it can be drawn therefrom by opening the valve 32a and operating the steam jacketed pump 33 which delivers the blended plasticized wax through a steam jacketed metering valve 34 and a percolator 35 containing a bed of bone black or other active carbon. A line containing a relief valve 31 by-passes the pump 33. The relief valve 31 is set to open only when pressure is excessive on the exhaust side of pump 33 and return part of the wax composition to the inlet side of the pump.

The details of construction of one suitable form of percolator 35 are shown in Figure 4. In this construction a pair of supporting members are provided by bending two pairs of angle irons to form the legs of A-shaped base members 80a and 80b (the cross bars on the A's not being shown), and to form columns 81a and 81b extending upwardly from the apex of the A. A cross bar 82 ties the columns 81a and 81b together at the top and completes the rigid support 83.

Supported on the frame 83 is vessel 84 having a cylindrical body portion 85 flanged at each end as at 86 and 87. A pair of shafts 88a and 88b are welded to the sides of body 85 and a corresponding pair of trunnions 89a and 89b are secured at the apex of the A between the angle irons forming the frame members 80a, 80b, 81a and 81b. The shafts 88a and 88b are pivotally mounted in the trunnions 89a and 89b to tiltingly support the body 85. A gear 90 is secured on shaft 89b and cooperates with a worm 91 mounted to revolve in bearings fixed to the column 81b. A crank is arranged to revolve worm 91 to tilt or raise the body 85. A steam jacket 92 surrounding the body 85 permits heat to be supplied to the contents.

A receiving chamber is provided at the lower end of the body 85 by an inverted cone shaped end 93, flanged at the base of the cone as at 94 and terminating in an outlet 95. A plate 96 having numerous small holes extending therethru and connected by shallow radial and concentric grooves forms a bottom for the chamber enclosed by the body 85. The periphery of plate 96 is located between the matching flanges 87 and 94 which are bolted together to secure the end 93 to the body 85 and this serves also to hold plate 96 in place.

A canvas or equivalent filter 97 is stretched over a pair of hoops 98 and 99 of slightly different diameter similar to embroidery hoops, the hoop 99 being just a litle smaller than the interior of body 85, for example, about ¼" to ⅜" smaller where the hoops are about three feet in diameter. In the preferred arrangement the canvas 97 is stretched over the hoop 99 and around the outside of this hoop and its periphery is turned in around the inside of the hoop 99, the small hoop 98 then being pressed in from the open face of hoop 99 into frictional engagement with the periphery of filter 97 drawing the filter taut over hoop 99. As may be seen in Figure 4 the resulting assembly is laid on the perforated plate bottom 96 with the canvas 97 extending in contact with this plate as shown in Figure 7. To prevent the active carbon from passing around the canvas 97, a packing material, 100, for example, absorbent cotton, is packed lightly around the assembly holding filter cloth 97 after this assembly is in place.

For operation on a commercial scale it has been found convenient to handle about 50,000 to 60,000 lbs. of wax in one batch. About 1,200 lbs. of bone black have been found to be adequate to substantially completely remove from a batch of clay filtered wax of this order any material therein imparting off-flavors and odors to flavor-sensitive foodstuffs. The percolator 35 is designed to handle a quantity of bone black of this order and satisfactory results have been obtained by constructing the body 85 to be about seven feet from end to end and about three feet in diameter. The 1,200 lb. charge of bone black 101 fills this body to somewhat over ⅔ of its volume.

A small bucket 102 perforated at the bottom as at 103 is set on top of the bone black 101 under the inlet 104 to absorb the force of the entering wax and prevent it from disarranging the bone black. The inlet 104 is provided with a float valve 105 which controls the flow of wax into the percolator 35 to maintain it at the desired level. To facilitate subsequent operations the inlet 104 is pivotally connected to the line from valve 34 so that inlet 104 can be taken out of the percolator 35 when the wax charge has all been supplied to the percolator 35.

As may be seen in Figure 4 the percolator 35 is provided with a removable cover 106. Cover 106 has a handle 107 which is adapted to be engaged by hook 108 on a bracket 109 pivotally mounted on the upright 81a as at 110. The pivotally mounted bracket 109 provides a convenient means for moving the cover 106 out of the way when it is not in use. When the wax has all been fed into percolator 35, inlet 104 is removed and the cover 106 is swung into place and secured on the body 85. To force out the last part of the wax, air under a pressure of about 5 lbs. per square inch is supplied thru the opening 111 in cover 106.

After passing through this bed, the treated wax composition enters a manifold 36 and then can pass through the steam jacketed outlet metering valves 37a, 37b, into a tank 40a or 40b. Figures 5 and 6 illustrate the details of construction of the steaming tanks 40a and 40b. Since these tanks are identical only 40a is shown. As figures 5 and 6 show tank 40a which is tin lined has a cylindrical body 112 provided with an integral bottom 113 which is slightly rounded to facilitate emptying of the tank thru the centrally located outlet 114. A steam jacket 115 surrounds the bottom of tank 40a. The top of tank 40a is open and is provided with a strengthening flange 116 and a cover (not shown) which is usually left on except when steaming. The wax composition is supplied to the tank thru an inlet 117 which communicates with either the line controlled by valve 37a or the line controlled by valve 37b as the case may be. The steaming treatment or steam distillation in tanks 40a and 40b involves bubbling clean dry steam up thru the body of wax composition in the tank whereby the undesired material is carried off. The steam is brought into tank 40a thru a line 118 which communicates with the line controlled by valve 42a. This line 118 is preferably made of Monel metal or like material. The end 119 of line 118 is bent into a circle slightly smaller in diameter than the body 112 of tank 40a and is closed at the end as at 120. The underside of the circular portion 119 is provided with a series of openings 121 thru which the steam escapes. By way of illustration it is pointed out that steaming tanks 40a and 40b of convenient size have a diameter in the body portion 112 of 8 feet and a height inside of 8 feet.

Figure 2:
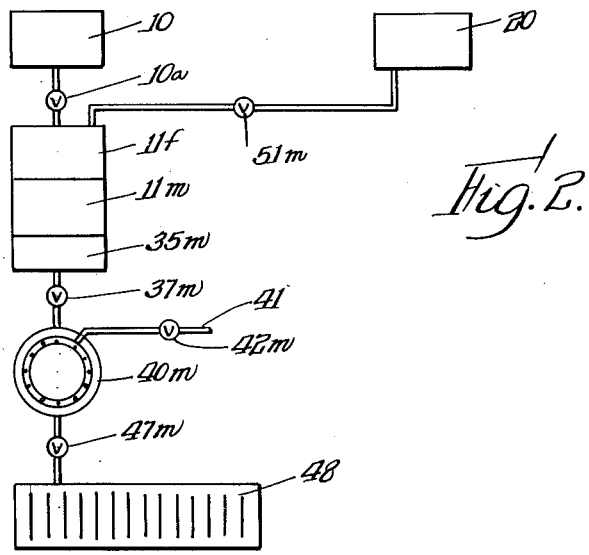
Figure 2 is a flow diagram illustrating an alternative arrangement in which a clay filter bed and an active carbon filter bed are located successively in a single chamber.

In Figure 2, a modification is shown in which molten impure wax composition from receptacle 10 is permitted to pass through a valve 10a into a single filtering chamber 11f, which has a relatively thin bone black layer 35m at its bottom, and a relatively thicker clay layer 11m thereover. Thus, there is a successive percolation through the clay and then through the bone black, whereby these filtering and absorbent agents cooperate to produce a light colored wax composition free from material imparting off-flavors and odors to flavor sensitive foodstuffs.

From the filtering vessel 11f the wax flows through a valve 37m into a steaming vessel 40m having a steam coil supplied with clean dry steam from the steam pipe 41 through the valve 42m. With this procedure, if plasticization is desired a melted petroleum plasticizer, for example, in a receptacle 20 is passed in predetermined measured amount into the vessel 11b, through a valve 51m along with or separately from the main body of wax composition. The blending of the plasticizer in the wax composition will be accomplished during steaming in vessel 40m if not before. When the steaming has been accomplished, the wax composition has been improved in color and flavor through the successive filtering and steaming actions and it may be withdrawn through a valve 41m into the slabbing mold 48.

Figure 3:
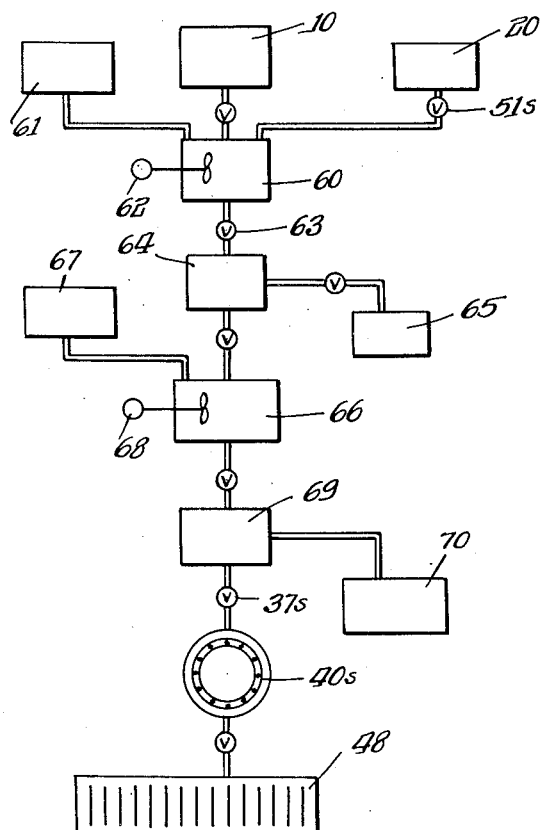
Figure 3 is a flow diagram illustrating still another alternative arrangement in which the clay and active carbon treatment are accomplished in a single chamber by suspending these treating materials successively in the wax, the clay being separated from the wax before the carbon is added.

In the form shown in Figure 3, the molten black wax composition in receptacle 10 is passed into a hot mixing chamber 60, and petrolatum plasticizer from the receptacle 20 is also brought into this mixing chamber by opening a valve 51s. Likewise, filter clay is brought into the chamber 60 from a reservoir 61. A mechanical agitator 62 then acts to cause a thorough mixture of the materials, and they are permitted to pass through the valve 63 into a separator 64, which may operate as a plate or rotary filter press or by centrifugal action to separate the spent clay from the plasticized wax composition, the spent clay being withdrawn from the wax composition and discharged as to a waste point 65, while the wax composition in the particular instance already plasticized with petrolatum, is passed through a second mixing chamber 66. Bone black from a reservoir 67 is then passed into the chamber 66 and agitation is effected for thorough mixing, illustratively by the mechanical mixer 68. The material is then withdrawn from the chamber 66 and passed into a second separator 69 which, as before, may be of filter press or centrifugal type. The spent bone black may be discharged to receptacle 70 for waste or recovery, while the double-filtered wax composition is passed through a valve 37s to the steaming vessel 40s which is provided with a steaming device as before, for the removal of volatile substances, imparting solvent type odors and flavors to the wax composition. Finally, the melted wax composition is passed into the slabbing mold 48.

Although not shown it should be understood that all the lines connecting various parts of the equipment illustrated in the above described diagrams preferably are either steam cored or steam jacketed as is most convenient. This aids in the maintenance of the wax composition at the desired temperatures.

In this specification and in the attached claims the color and flavor of particular wax compositions are described by one or more of a series of arbitrary legends. The legends used to describe the color are the following which have been adopted as standard by the National Petroleum Association:

Color Legends

White
Cream

| | |
|---|---|
| NPA-1 | Very light amber |
| NPA-2 | Light amber |
| NPA-3 | Medium amber |
| NPA-4 | Amber |
| NPA-5 | Dark amber |
| NPA-6 | Light brown |
| NPA-7 | Medium brown |
| NPA-8 | Brown |

To the foregoing standard legends the legend "8+Black" has been added to provide a designation for colors darker than NPA-8.

Since there is no recognized standard test for evaluating the flavor of a wax and since there are no recognized units of flavor in terms of which an evaluation could be made it has been necessary to devise a flavor test and to define flavor ratings in order to make understandable flavor comparisons between different wax compositions. By extensive investigation it has been established that when trained experts use the following test their evaluations of the flavor of wax compositions in terms of the flavor ratings shown therein will not differ by more than number.

Flavor Test

Preparation of sample

On a platform scale weigh to the nearest 0.1 gram a 2 gram sample of the wax to be tested. Form the wax into the shape of a pencil. (*Note.—* This wax must never have been heated at any time previously except in the process of refining.)

Procedure

Place the pencil shaped 2 gram sample of wax in a ¾" x 6" test tube; stopper the tube with a new or flavor free cork and submerge the tube ¾ of its length in a water bath maintained at 185° F. Remove the stoppered test tube after the wax has melted and immediately rotate the test tube in a nearly horizontal plane so that the bottom ¼ to ⅓ of the test tube walls will be coated with wax. Solidification of the wax should take place while the test tube is rotated. After the wax has solidified immerse the stoppered tube of wax in an ice water bath at 32° F. for a minimum time of ten minutes. Take a quantity of water distilled from potassium permanganate solution and bring to a boil for an instant. Remove the cooled test tube from the ice water bath and pour 20 cc. of the hot distilled water into the cooled test tube, containing the wax, removing the stopper only long enough to add the hot water. (A convenient means for heating the water is to use a Florence flask type wash bottle fitted with an aspirator bulb. Also a 22 cc. mark previously marked on the outside of the test tube is an advantage.) Restopper the test tube and immerse ¾ of its length for 30 minutes in a water bath maintained at 185° F. Remove the tube and immediately rotate the hot stoppered test tube in a nearly horizontal plane under running cold tap water so that the wax will become coated on the upper side of the test tube. This permits pouring the water solution from the tube without disturbing the wax. Cool the tube to 50° F. to 60° F. under cold running tap water and allow to stand in a test tube rack at room temperature for at least 2 hours and not more than 8 hours, during which interval of time test the water extract for flavor and odor by tasting a small portion of the water extract and grade the flavor by a number as described below.

| Flavor Rating Values | Explanation |
|---|---|
| 0—No Flavor | Flavor not detectable even by a trained expert. |
| 1—Trace of solvent, waxy, oily or earthy flavor | Detectable only with difficulty even by a trained expert. |
| 2—Faint solvent, waxy, oily or earthy flavor | Easily detectable by a trained expert. |
| 3—Slight solvent, waxy, oily or earthy flavor | Average untrained person can just begin to detect it. |
| 4—Solvent, waxy, oily or earthy flavor | Average untrained person can easily detect it. |
| 5—Very pronounced solvent, waxy, oily or earthy flavor. | Varying in intensity. |

Further explaining the terms, it is pointed out that the expression "free of odor and flavor" wherever it is used thruout this specification and in the appended claims is to be understood to mean having a flavor value less than 2 as defined in the above table of flavor rating values. Thus, if the odor and flavor are easily detectable by a trained expert in the above described test then the wax composition is not "odor and flavor free" but if it can be detected by a trained expert only with difficulty in the test described then it is "odor and flavor free." The reasonableness of this definition of "odor and flavor free" becomes apparent that the flavor from 2 grams of the wax composition is concentrated into 20 cc. of water in the test whereas in actual use in contact with flavor sensitive products the quantity of product in contact with 2 grams of the wax will exceed 20 cc. by at least tenfold. A very excellent illustration of this is found in beer cans. For example, the quantity of the wax composition used to provide a protective lining in a 12 oz. beer can is only 2 grams so that the quantity of beer in contact with the wax composition in a beer can is 18 times larger than the 20 cc. of water used in the test to extract the same 2 grams. Because of the wide difference in quantity between the water in the test and the odor and flavor sensitive product exposed to the wax composition in use an odor and flavor which is detected in the test by even a trained expert only with difficulty cannot be detected by anyone in an odor and flavor sensitive product which is exposed to the wax composition having a rating of 1 in the test is in truth and for all practical purpose odor and flavor free. This is borne out by actual tests with delicately flavored beers which are exceptionally sensitive to odors and flavors of wax compositions with which they remain in contact. When delicately flavored beer is packed in a 12 oz. can lined with two grams of a microcrystalline petroleum hydrocarbon wax composition having a flavor rating of less than 2, and otherwise suitable physical properties, no off-odors or off-flavors derived from the wax compositions can be detected by anyone even after pasteurizing the beer in the container and then storing the container over long periods.

In the preceding paragraph the description of the wax composition to be used in lining the beer can includes the expression "otherwise suitable physical properties." The physical properties particularly referred to are flexibility at 32° F. and lack of a tendency to melt or soften sufficiently to permit extraction of any lower melting point fractions by beer in contact therewith at pasteurizing temperature, (usually 140°–150° F.). The flexibility at 32° F. is required to enable the lining to remain adherent to the can without breaking even when the can receives a blow which is severe enough to deform the can. It has been found, however, that the microcrystalline petroleum hydrocarbon wax compositions as separated by the fractional crystallization processes now used altho satisfactory from an odor and flavor standpoint when treated with clay and then with active carbon and then steamed as described above do not include even one composition which meets all the other specifications set forth above for a satisfactory beer can wax. Flexibility at low temperatures increases in such wax compositions as the cut is broadened including lower melting point fractions and the compositions of lower melting point usually have increased low temperature flexibility as compared with compositions of higher melting point and about the same width of cut altho these are only generalizations. However, those compositions having a width of cut and melting point such that they are flexible at 32° F. all melt or soften sufficiently at temperatures of 140°–150° F. to permit extraction of lower melting point fractions by beer in contact therewith. The objection to such extraction is that the wax fractions so extracted serve as nuclei for the formation of particles in the beer which give the beer an objectionable cloudy appearance. Collection and analysis of such particles shows that they include a minor amount of the wax fraction and that apparently proteins and other materials in the beer are accumulated by the wax fraction to form the particles which are observed. Similarly, it has been observed that in other applications requiring flexibility at a low temperature coupled with an ability to resist much higher temperatures, none of the wax compositions referred to above which are separated by the fractional crystallization processes now used meet both requirements.

It has been found, however, that by selecting a wax composition which is cut narrowly enough i. e. crystallized out over a narrow enough temperature range—and which has a high enough melting point and then adding to this wax composition a low melting point petroleum hydrocarbon composition such as an oil or a petrolatum or even a low melting point wax composition, the desired low temperature flexibility can be obtained and at the same time the melting point of the resulting blend will still be high enough to enable the wax composition to meet a desired high temperature specification. Adhesive or sealing compositions can also be formed by such blending of low melting point petroleum hydrocarbon composition with higher melting point wax compositions.

One application of the foregoing principles is made in preparing a wax composition for lining containers for beer, particularly metal beer cans and a full description of this application will serve as an illustration from which those skilled in the art will understand how to make other particular applications. The properties required in the wax compositions for lining beer cans have been set forth above. To meet these a fraction of microcrystalline petroleum hydrocarbon wax which has an ASTM melting point of preferably about 165° F. to about 200° F. is selected as the base to which the lower melting point petroleum hydrocarbon composition is to be added. The melting point alone is not a sufficient indication of the suitability of wax composition as a base, however. The width of the cut is also a factor. An indication of the width of the cut is obtained by measuring the ASTM penetrometer value at 77° F. but it is better to rely on the bend test and the hot stage test to be described. These tests in addition to establishing whether the base is satisfactory also indicate the proportion, if any, of a particular low melting point petroleum hydrocarbon composition which when added to the base will produce a wax composition having the required properties.

Hot Stage Test

Apparatus

Leitz 50X microscope or equivalent.
"Automatically regulated electric heating stage after Walton" complete with special thermometer range 100° F. to 220° F. in 2 degree steps, mercury thermostat, and 110 to 220 volt rheostat.
Supply of glass slides 1" x 3" x 1 mm. thick.
Supply of cover glasses 15 mm. x 15 mm.
Stop watch.

Procedure

Make up one 50 gram sample of laboratory blends of the wax composition to be tested with each of the following percentages of white petrolatum plasticizer having an ASTM melting point of 115°–120° F.: 0%, 10%, 12%, 14%, 16%, 18%, 20%, and 22%. Stir the blends thoroughly and pour off small samples of each blend into small glass vials or ¼ ounce ointment cans and allow the waxes to solidify and cool to room temperature. Arrange the samples of wax to be tested in the order of their hardness by stabbing with a needle or penetrometer. Take a very small specimen of each wax (approximately 0.5 mm. in diameter) on the end of a clean ordinary sewing needle and roll each wax off the needle onto the glass slide by rotating the needle ½ to ¾ revolution while in contact with the glass slide. The square area on the slide containing the unknown (preferably together with adequate controls where the test is used as a routine laboratory test) should be enclosed in a space of not more than 12 mm. x 12 mm. With a six thickness pad of cheesecloth placed over the eraser end of a pencil press down over the wax specimens a 15 mm. square microscope cover glass just enough so that upon examination the specimens of wax will be flattened equally and may assume an approximate diameter of from 0.75 to 1.00 mm. Care must be taken not to smear the wax specimens on the slide. Logically controls when used should be placed on the glass slide nearly adjacent to the unknown wax specimens to be tested.

After the specimens have been arranged on the slide as outlined, plug in the hot stage to allow the temperature of the stage to rise. When the temperature reaches 104° F., place the slide with the wax specimens on the hot stage, then allow the temperature to rise to 114.2° F. at which time barely close the mercury thermostat allowing the temperature to coast to and be maintained at 130° F. The instant 130° F. is reached turn on the stop watch and at the end of 4½ minutes observe through the microscope for the next ½ minute any ringing of the samples of wax making notation as follows:

NR—No ringing
NS—None to slight ringing
SR—Slight ringing
DR—Definite ringing
DM—Decided melting
AM—All melted Ringing or fractional melting usually occurs at the edge or completely around the periphery of the bit of wax depending upon the physical conditions that the wax specimen has been subjected to and appears as a "fringe" or partial "fringe" of light colored transparent fluid. Better visibility of this "fringe" of melted wax may be effected by adjusting the mirror on the microscope to more intensely light the "fringe" of melted wax, recording the results as soon as they have been observed.

As soon as the 130° F. observations have been completed at the end of the first 5 minute interval, adjust the mercury thermostat so that the temperature will be raised within 2 to 3 minutes to 135° F., and repeat the same observations as at 130° F. and make notations as before. This total interval at 135° F. must be 5 minutes.

Repeat the above procedures for 140° F., 145° F. and 150° F.

The following table gives hot stage melting point ratings evaluating the blended wax composition in comparison with the minimum requirements of a wax composition to be used as a lining in metal beer cans pasteurized at about 140° F. together with the hot stage melting point data which correspond with the rating.

| Hot Stage Melting Point Rating | Acceptability for about 140° F. Pasteurization | Ringing | | | | |
|---|---|---|---|---|---|---|
| | | 130° F. | 135° F. | 140° F. | 145° F. | 150° F. |
| ++++ | Acceptable | NR | NR | NR | NR | NR |
| +++ | ....do.... | NR | NR | NR | NR | NS |
| ++ | ....do.... | NR | NR | NR | NS | SR |
| + | Barely Acceptable | NR | NR | NS | SR | DR |
| − | Not Acceptable | NR | NS | SR | DR | DM |
| −− | ....do.... | NS | SR | DR | DM | AM |
| −−− | ....do.... | SR | DR | DM | AM | AM |

Greater accuracy is achieved by using controls and by giving unknown wax specimens having the same fringing characteristics as a certain control wax at the same particular temperature the ringing legend of that certain particular control wax.

The suitability of a particular wax composition as a base is also established by the above test since it includes an unblended base specimen. If this unblended base specimen is not acceptable then addition of petrolatum will not make it acceptable. On the basis of the above illustration application of the test with low melting point petroleum hydrocarbon plasticizers other than the petrolatum specified will be apparent to those skilled in the art.

BEND TEST

Apparatus

Straight copper tubing 8 inches long and $\tfrac{3}{16}$ inch inside diameter.
Brass rod 14 inches long and ¼ inch in diameter.
One large cork, size 12 to 14. Drill in the cork for approximately half its length, a hole the size of which is equal to the outside diameter of the copper tube.

Preparation of sample

Prepare 15 to 20 gram samples of each of the laboratory blends of the wax composition to be tested which are described above for the hot stage test. Melt into a dish or can approximately 15 to 20 grams of one of these blends. Allow the temperature of the wax composition to rise in the case of an about 180° F. ASTM melting point wax composition to 230° F., but no higher, and for other melting points in proportion.

Procedure

Insert the copper tubing into the hole in the cork and set the assembly upright on a board with the cork serving as a holder. With a Bunsen burner heat the copper tube enough so that a small bit of wax composition attached near the upper open end becomes melted. Immediately fill the copper tube with the hot wax composition (not over 230° F.) for example, for wax compositions having ASTM melting points of about 180° F., grasp the assembly by the cork between the thumb and first finger and hold the assembly under cold running tap water at an angle of approximately 45°. Proceed to cool the tube of wax composition by starting the cooling at the bottom near the cork and then slowly chilling the entire copper tube by passing it through the cold running tap water allowing at least two to three minutes for this operation. It is extremely important that this filling and cooling be followed explicitly by which method a solid wax composition specimen will be cast without difficulty.

Remove the cork from the copper tube. Insert the brass push rod into the shrunken end of the wax composition tube, and, using the brass rod as a holder, pass the copper tube containing the wax composition through the flame of a Bunsen burner quickly two or three times. Hold the tube lightly with a pair of pliers and push the wax composition stick from the copper tube. Discard the upper half of the wax composition stick since this contains a shrinkage hole. The bottom half, which is approximately 4 inches long should be solid throughout, otherwise the above operations must be repeated.

Submerge the 4 inch stick of wax composition for 10 minutes in an ice water bath maintained at 32° F. (Caution: The ice water must be no higher than 33° F.) The stick of wax composition may be held under water by the pieces of ice and in no case is it to be held submerged with the fingers.

At the end of 10 minutes remove the wax composition stick from the ice water bath and immediately grasp the ends of the wax composition stick between the thumbs and fingers and bend as quickly as possible into the form of a hairpin flattened on itself.

A wax composition to be satisfactory for metal beer can linings should show no fracture along the ouside circumference of the bend. A lightening of the color of the wax composition at the bend can be expected and is satisfactory if cracking does not take place.

Repeat the foregoing for each blend to be tested. It will be obvious, however, that by starting with a blend which is expected to meet the test and then taking blends varying in order from the first, the necessity for testing some blends may be avoided since blends containing less petrolatum than one which fails will also fail. Also the testing can be decreased by eliminating blends which are not acceptable in the hot stage test since a wax composition to be satisfactory must pass both tests. A wax composition base which when plasticized with petrolatum, as described, fails in this test will sometimes pass if a petroleum hydrocarbon oil is used as the plasticizer.

In order that the invention may be better understood the following detailed examples are given. These examples are intended to be construed as illustrative only and not as limiting the scope of the invention:

EXAMPLE I

Fifty thousand pounds of a narrow fraction of a microcrystalline petroleum hydrocarbon wax composition, having an ASTM melting point of 185° F. to 190° F., a color darker than NPA-8, a flavor rating of 4 to 5 and substantially no acid number and saponification value is melted at a temperature of 215-220° F. in a tank such as tank 10 in Figure 1.

From tank 10 the melted wax composition is drawn off through a line as illustrated in Figure 1 above, and percolated through a body of about 800 pounds of decolorizing clay in a clay filtering tower as represented by the numeral 11 in Figure 1. The wax composition leaves the clay filter 11, then passes through lines, as shown in the flow diagram, into a blending tank such as 14a. The wax composition is accumulated in this blending tank until the entire 50,000 pounds has been filtered, and while maintaining it at a temperature of 215-220° F., is agitated to thoroughly blend the filtered wax composition. When the blending is completed it will be found that the clay filtering has reduced the color of the wax composition to about NPA-4 color.

From the blending tanks 14a the 50,000 pounds of the wax composition is passed into a measuring and plasticizing tank, such as tank 18a. Heat supplied thru the bottom steam jacket of tank 18a maintains the wax at the desired temperature of 215-220° F. Previously it has been determined by the hot stage test and the bend test that 10,000 pounds of a pharmaceutical grade of white petrolatum having an ASTM melting point of 115-120° F. when blended with the 50,000 pounds of wax composition will give a resulting blend meeting the requirements for a wax composition to be used in lining metal beer cans and this 10,000 pounds of petrolatum has been melted in a tank such as holding tank 20, and with the aid of heat supplied through a steam jacket brought up to a temperature of about 215-220° F. It is now passed from the tank 20 into the tank 18a already containing the 50,000 pounds of clay filtered wax composition. The mixture in tank 18a is then agitated until a uniformly blended wax composition is obtained.

1,200 pounds of new bone black is placed in a steam heated air circulating oven at 200°-220° F. and held there for at least 48 hours to dehydrate it to a moisture content of less than 2% ASTM. Generally this bone black is placed in the oven approximately 48 hours before it is anticipated that the wax mixture in tank 18a will have been prepared as described in the preceding paragraph.

A canvas filter such as the filter 97 in Figure 4 is then stretched over a pair of hoops 98 and 99 and placed in the bottom of a percolator 35 as described above. The void around this hoop assembly between it and the inner wall 85 of the percolator is packed lightly with absorbent cotton as at 100 forming a continuous ring of packing so that none of the bone black to be added can pass thru. The 1,200 pounds of bone black which has been in the oven for at least 48 hours is removed and one half is placed in percolator 35. A thermocouple is placed on top of and in the center of this one half of the charge and the remaining 600 pounds of hot bone black are then placed in the percolator immediately. A reading of the temperature is taken at this stage and if the temperature in the center of the bone black is below 180-185° F., steam is passed into the jacket of the percolator in an amount not to exceed 8 pounds pressure in order to bring the temperature up altho preferably it is not heated above about 185° F.

The wax blend previously drawn off from tank 18a and passed into measuring tank 30a is now pumped by pump 33 into the percolator 35. It enters thru metering valve 34 and float valve 105 and is directed into the bucket 102 which has previously been placed on top of the bone black charge 101. A metering valve 37a at the exit from percolator 35 is left wide open at this stage but the valve 34 is set to pass the hot wax composition at a rate such that the volume of wax flowing into percolator 35 every 45 seconds is just sufficient to fill a cylindrical container having an inside diameter of 5 inches and a depth of 12½ inches inside. This volume of wax composition weighs 6.9 pounds at 200° F. The rate is arbitrarily called the "45 second rate."

As soon as wax begins to flow thru metering valve 37a this valve is closed. When the wax composition has been flowing into percolator 35 for 2 hours, metering valve 87a is opened just sufficiently to allow the wax to flow thru it at a 60 second rate, i. e. at a rate such that the volume passing in 60 seconds is just equal to that of the above described 5 inch diameter cylindrical container.

From the valve 87a, the wax is passed thru lines as shown in the diagram of Figure 1 and collected in a steaming tank such as tank 40a. Examination of a sample of the wax composition withdrawn at this point disclosed that the wax composition now had a flavor rating of 2. In tank 40a the wax is maintained at a temperature of 215° F. to 225° F. thru steam supplied to the jacket 115 as shown in Figure 5. When all of the wax composition is collected in tank 40a clean, thoroughly dried steam precleaned in a bone black cleaner is directed thru line 118 and escapes thru openings 121 in the Monel metal ring 119 as shown in Figures 5 and 6. The steam supply is adjusted so that it bubbles up thru the wax in tank 40a rapidly but not fast enough to cause the foam on the wax to cover the entire surface. This steam bubbling up thru the wax distills off any volatile material present which would impart solvent type odors and flavors to flavor sensitive foodstuffs. Altho the starting material was substantially free of such materials they are usually formed in the wax during the bone black treatment and the steam distillation is resorted to for the purpose of insuring their removal.

After steam has been bubbled thru the wax composition in tank 40a for a little more than 2 hours the steam supply is shut off. The steam distilled wax composition is now passed into tank 45a. From this latter tank the wax composition is passed as convenient to the slabbing mold 48. The slabs of wax removed from this mold may be shipped to any desired point and used to line beer cans or the wax from tank can be applied to such use directly without slabbing if desired. This wax composition now has a flavor rating of 1 but still has a color of NPA 4.

In order to recover the maximum amount of wax composition, the line 104 is lifted out of percolator 35 when the last of the 60,000 lbs. of blended wax composition has been passed into percolator 35 and the cover 106 as shown in Fig-4 is swung into position. After the cover is clamped to the body 85 of percolator 35 air under a pressure of about 5 lbs. is admitted thru inlet 111 to force out the last part of the wax in percolator 35. Thereafter cover 106 is removed after exhausting the air and the bone black in percolator 35 is taken out and the percolator is otherwise cleaned in preparation for a new batch of wax.

The slabbed wax from mold 48 after melting or the wax from tank 45a is ready to be applied to beer cans. For this purpose it is heated to a temperature of 200°–250° F. and at this temperature 12 oz. cone top metal beer cans are flushed with this and then hung top down to drain. By this procedure a continuous lining consisting of about 2 grams of the wax composition is applied to the cans. When cans so lined are filled with beer, capped, pasteurized at about 140° F. and stored it has been found the beer does not acquire any odor or flavor from the wax composition, that no wax containing particles are formed in beer and that the lining does not break or separate from the can even when the can is sharply deformed at temperatures as low as 32° F. Furthermore, the wax composition even after it has been exposed for 240 hours or more to air oxidation at 200°–250° F. as in the body of wax composition with which the cans are flushed as described above still retains its original flavor rating of 1.

Results substantially the same as those described in this example are obtained where the procedure is exactly the same except that the 10,000 pounds of petrolatum are replaced with 3,000 pounds of a white petroleum hydrocarbon oil. A composition for lining beer cans which meets all the specifications, that is, is odor and flavor free and having the other required physical properties was made by the exact procedure described in this example except that the crude starting material was 50,000 pounds of a narrow fraction of a microcrystalline petroleum hydrocarbon wax composition, having an ASTM melting point of 182° F.–184° F., a color darker than NPA–8, a flavor rating of 4 to 5, an ASTM penetrometer value at 77° F. of 8–9 and substantially no acid number and saponification value and except that only 9,523 pounds of the petrolatum were added. In still another modification the procedure is again exactly the same as that described above except that the crude starting material described in the preceding sentence used and except that a white petroleum hydrocarbon oil was added instead of the petrolatum in the ratio of 2,910 pounds of the oil to the 50,000 pounds of unblended wax composition.

EXAMPLE 2

Fifty thousand pounds of a 160° F. ASTM melting point microcrystalline petroleum hydrocarbon wax composition having a color darker than NPA–8, a flavor rating of 5 and substantially no acid number and saponification value is filtered thru 800 pounds of clay as described in Example 1. It is then blended with 7,000 pounds of a white petrolatum having an ASTM melting point of 115°–120° F. and further processed as in Example 1. The resulting wax composition is odor and flavor free and in addition has good adhesive properties and low moisture vapor transmission characteristics which adapt it for use as a heat sealing or laminating adhesive in the manufacture of paper, foil and metal containers and wrappers for flavor and odor sensitive products; particularly food products where resistance to high temperatures is not required.

Although the invention has been illustrated with reference to microcrystalline petroleum hydrocarbon wax compositions having ASTM melting points from 160° F. to about 185° F. it is applicable to the treatment of crude microcrystalline petroleum hydrocarbon waxes generally which have a color darker than NPA–4 and ASTM melting points as high as 250° F. to 300° F. or even higher. Usually such crude wax compositions have an NPA color darker than 8 and a flavor rating of 4 to 5. The wax composition selected in any particular instance will depend on the properties desired in the final product.

Further, 84 parts by weight of a microcrystalline petroleum hydrocarbon wax composition having an ASTM penetrometer value of about 9 to 11 may be mixed, while undergoing a procedure as herein described, with about 16 parts by weight of a pharmaceutical grade of white petrolatum having an ASTM melting point of 115–120° F. or 5.5 parts by weight of a pharmaceutical grade of white mineral oil; the mixed composition produced having substantially no acid number and saponification value, an NPA color greater than 1, not melting and not softening sufficiently to permit extraction of any lower melting point particle forming fractions by beer in contact therewith during pasteurization at temperatures of from about 140° F. to about 150° F., being flexible in thin films at 32° F. and remaining odor and flavor free even when aerated at temperatures of from about 50° F. to about 100° F. above its ASTM melting point for periods upwards of 240 hours.

The desired reduction in color to an NPA value of at most 4, preferably for economic reasons, 2 to 4, may be obtained with the clay in any convenient way bearing in mind, however, that as the ratio of clay to wax composition is increased and as the temperature and/or the contact time are increased the greater is the amount of earthy or moldy flavor acquired by the wax composition and requiring subsequent removal by the active carbon. Blending following the clay filtration permits maximum use of the clay without wide variations in the color of the product. For economic reasons there is an advantage in treating with clay at a temperature of same order as that used in the active carbon treatment and then following clay treatment with active carbon treatment without permitting the wax to cool but the results described herein are obtained even if the wax cools enough to solidify or even down to ordinary temperature and is given the active carbon treatment after a lapse of time so that the clay treatment can be carried out at any time so long as it precedes the treatment with active carbon.

Although any desired temperature at which the wax composition is fluid enough to handle satisfactorily may be used in the active carbon treatment it is preferable to avoid the use of temperatures which greatly exceed the ASTM melting point of the wax composition since the tendency of the active carbon to cause formation of material imparting solvent type odor and flavor to the wax composition is much greater at higher temperature and since in general the lower the melting point of the wax the greater the content of the low melting point fractions which are most easily broken down by the wax to form material imparting solvent type odor and flavor. Thus, in general, it is preferable to carry out the active carbon treatment at a temperature at which the active carbon shows its maximum activity without causing excessive formation of material imparting solvent type odors and flavors to the wax composition subject to the qualification that the temperature shall be high enough to maintain the wax composition in a fluid state. For example, the activity of bone black increases as the temperature is increased but above about 210°-220° F. begins to cause excessive formation of material imparting solvent type odors and flavors to the wax composition particularly when the ASTM melting point of the wax composition is below about 180° F. so that with such compositions it is preferable to treat with bone black at a temperature of 210°-220° F. With wax compositions melting above 180° F. the tendency to form solvent type odors and flavors is not so great and with wax compositions which are not fluid at 210°-220° F. it is necessary to treat with bone black at temperatures above 220° F. Generally, however, it is preferable to treat at a temperature which does not exceed 210°-220° F. by more than the difference between the melting point of the particular wax composition and 180° F. Percolation of the wax thru the bone black is also preferred altho other methods may be used as indicated above. Where percolation is used the bone black is preferably dried at about 200°-220° F. immediately prior to use to avoid foaming where the wax composition first comes in contact with it. For the same reason after dehydration it is preferable to maintain the bone black above about 180° F. and where the treatment is to be at 210°-220° F. to have it at a temperature of 180°-185° F. when the wax is first contacted with it. The wax at 210°-220° F. will freeze if the bone black is too cold and in addition will cause foaming and undesirable oxidation products are produced in greater quantity by cold bone black due to the presence of air and moisture in the bone black when it is cold. On the other hand it is desirable to have the bone black below the treatment temperature when the wax composition first comes into contact with it because at this stage heat is produced by the contact in sufficient quantity to materially increase the temperature. The effect of the bone black in percolation also varies with the amount employed and the rate of flow of the wax composition therethrough. These may be varied as desired. Suitable quantities and rates of flow are illustrated in the above examples and from these those skilled in the art will be able to select appropriate conditions of treatment in any particular instance.

As pointed out above the steam distillation is to remove material imparting solvent type odor and flavor to the wax composition. The art of steam distillation is well understood and suitable conditions of steam distillation will be readily apparent.

Because of its freedom from odor and flavor, because it does not acquire odor and flavor due to oxidation on prolonged exposure to oxidizing conditions at high temperature and for the further reason that the wax compositions can be so compounded in the light of the principles enunciated above to have other unusual physical properties the product of this invention is adapted to a wide variety of uses. It has been found, for example, that the wax compositions disclosed herein, for example, that made by the process of Example 1, even when subjected to aeration at temperatures of 200° to 250° F. for periods upwards of 240 hours or longer remain odor and flavor free.

By way of further illustration by selecting wax compositions having a suitable melting point and of proper width of cut and then combining these with a lower melting point petroleum hydrocarbon plasticizer such as an oil, petrolatum, or even a low melting point wax composition, microcrystalline petroleum hydrocarbon wax compositions are obtained which are adapted to be used in the manufacture of containers and wrapping material used in the packaging of odor and flavor sensitive products, for example metal beer cans. Thus for products processed at temperatures of about 250° F. compositions are provided which withstand temperatures up to about 250° F. during sterilizing of such products and which are also flexible in thin films at temperatures at which said products are ordinarily stored in containers and wrapping materials; for products sterilized at temperatures of 212° F. compositions are provided which withstand 212° F. during sterilizing at temperatures of 212° F. and are flexible in thin films at temperatures at which these products are ordinarily stored in containers and wrapping material; for products which are pasteurized at temperatures of about 180° F. compositions are provided which withstand temperatures up to about 180° F. during pasteurization and are flexible in thin films at 32° F.; for products which are pasteurized at from about 140° F. to about 150° F. compositions are provided which withstand temperatures of about 140° F. and others which withstand temperatures up to about 150° F. during pasteurization and which are flexible in thin films at 32° F.; for products which are preserved by freezing, compositions are provided which withstand temperatures up to about 130° F. and which are flexible in thin films at 0° F.; and for products which are packaged at ordinary temperatures compositions are provided which withstand temperatures up to about 130° F. and are flexible in thin films at 32° F. The foregoing compositions may be used in the manufacture of the various types of containers and wrapping material in many ways as for example, as inside coatings, outside coatings, adhesives and sealing materials.

In addition to providing microsystalline petroleum hydrocarbon wax compositions having novel and unusual physical properties as set forth above, the process of the present invention is also advantageous economically. Whereas in prior bone black treating processes for decrease the quantity of material imparting odor and flavor to flovar sensitive products only about 7,200 pounds of wax composition can be treated with 1,200 pounds of bone black, in accordance with the present process more than 50,000 pounds of wax composition can be treated with 1,200 pounds of bone black and the cost of the clay treatment is far less than the saving on the bone black treatment.

It is obvious that the illustrated examples of practice are not restrictive and that the invention may be employed in many ways in the scope of the appended claims.

What we claim is:

1. The method of making an odor and flavor free microcrystalline petroleum hydrocarbon wax composition adapted to be used for lining beer cans which comprises melting at about 210° F. to 220° F. a microcrystalline petroleum hydrocarbon wax composition having an ASTM melting point at 182° F.–184° F., a color darker than NPA-8, an ASTM penetrometer value at 77° F. of 8–9, a flavor rating of 4–5, and substantially no acid number and saponification value, percolating 125 parts, by weight, of said melted wax composition thru 2 parts, by weight, of a decolorizing clay until the color of said wax composition is reduced to NPA about 4, then blending with said 125 parts, by weight, of wax composition 24 parts, by weight, of a pharmaceutical grade of white petrolatum having an ASTM melting point of 115°–120° F., then percolating the resulting 149 parts, by weight, of wax composition thru 3 parts, by weight, of bone black having a temperature of at least 180° F.–185° F. and just previously dehydrated at 200° F. to a moisture content of less than 2% ASTM, maintain the wax composition in contact with the bone black at a temperature of about 210° to 220° F. and percolating the wax composition thru the bone black at a rate of about 0.01725 part, by weight, per minute, then with the resulting composition heated to 215°–225° F. bubbling clean dry steam there thru for about 2 to 3 hours at a rapid rate just below that causing foam to cover the entire wax composition surface.

2. The method of making an odor and flavor free microcrystalline petroleum hydrocarbon wax composition adapted to be used for lining beer cans which comprises melting at about 210° F. to 220° F. a microcrystalline petroleum hydrocarbon wax composition having an ASTM melting point of 182°–184° F., a color darker than NPA-8, an ASTM penetrometer value at 770° F. of 8–9, a flavor rating of 4–5, and substantially no acid number and saponification value, percolating 125 parts, by weight, of said melted wax composition thru 2 parts, by weight, of a decolorizing clay until the color of said wax composition is reduced to NPA about 4, then blending with said 125 parts, by weight, of wax composition 7.3 parts, by weight, of a pharmaceutical grade of white mineral oil, then percolating the resulting 132.3 parts, by weight, of wax composition thru 3 parts, by weight, of bone black having a temperature of at least 180° F.–185° F. and just previously dehydrated at 200° F. to a moisture content of less than 2% ASTM, maintaining the wax composition in contact with the bone black at a temperature of about 210° to 220° F. and percolating the wax composition thru the bone black at a rate of about 0.01725 part, by weight, per minute, then with the resulting composition heated 215°–225° F. bubbling clean dry steam there thru for about 2 to 3 hours at a rapid rate just below that causing foam to cover the entire wax composition surface.

3. An odor and flavor free microcrystalline petroleum hydrocarbon wax composition adapted to be used for lining metal containers for beer, which wax composition is a blend of about 84 parts, by weight, of a microcrystalline petroleum hydrocarbon wax composition having an ASTM melting point of about 180°–185° F. and an ASTM penetrometer value of about 9 to 11 with 16 parts, by weight, of a pharmaceutical grade of white petrolatum having an ASTM melting point of 115°–120° F., and which first named wax composition has substantially no acid number and saponification value, has an NPA color greater than 1, does not melt and soften sufficiently to permit extraction of any lower melting point particle forming fractions by beer in contact therewith during pasteurization at temperatures of from about 140° F. to about 150° F., is flexible in thin films at 32° F. and which, even when aerated at temperatures of from about 50° F. to about 100° F. above its ASTM melting point for periods upwards of 240 hours, remains odor and flavor free.

4. An odor and flavor free microcrystalline petroleum hydrocarbon wax composition adapted to be used for lining metal containers for beer, which wax composition is a blend of about 94.5 parts, by weight, of a microcrystalline petroleum hydrocarbon wax composition having an ASTM melting point of about 180–185° F. and an ASTM penetrometer value of about 9 to 11 with 5.5 parts, by weight, of a pharmaceutical grade of white mineral oil, and which first named wax composition has substantially no acid number and saponification value, has an NPA color greater than 1, does not melt and soften sufficiently to permit extraction of any lower melting point particle forming fractions by beer in contact therewith during pasteurization at temperatures of from about 140° F. to about 150° F., is flexible in thin films at 32° F. and which even when aerated at temperatures from about 50° F. to about 100° F. above its ASTM melting point for periods upwards of 240 hours, remains odor and flavor free.

5. The method of making an odor and flavor free microcrystalline petroleum hydrocarbon wax composition adapted to be used for lining metal cans which comprises melting at about 210° F. to 220° F. a microcrystalline petroleum hydrocarbon wax composition having an ASTM melting point of at least about 160° F., a color darker than NPA-8, an ASTM penetrometer value at 77° F. of around 8-9, a flavor rating of at least 4, and substantially no acid number and saponification value, contacting 125 parts, by weight, of said melted wax composition with 2 parts, by weight, of a decolorizing clay until the color of said wax composition is reduced to NPA about 4, separating the said wax composition while still molten from the clay, then contacting the molten composition with 3 parts, by weight, of bone black having a temperature of at least 180° F.-185° F. and just previously dehydrated at 200° F. to a moisture content of less than 2% ASTM, separating the composition while still molten from the bone black, then with the composition heated to 215°-225° F. bubbling clean dry steam therethrough for about 2 to 3 hours at a rapid rate just below that causing foam to cover the entire wax composition surface, and including the step of mixing with the said wax composition prior to the bubbling of steam therethrough a quantity of a petroleum hydrocarbon composition melting below said wax and selected from the group consisting of oils and petrolatums in quantity of substantially 5.5 to 24 parts by weight to said 125 parts by weight of original melted wax composition, the quantity being effective to confer upon the mixed composition the property of bending in a thin film without breaking at 32° F. and being essentially free from melting and objectionable softening at a temperature of at least 140° F.

6. The method of making an odor and flavor free microcrystalline petroleum hydrocarbon wax composition which comprises melting at about 210° F. to 220° F. a microcrystalline petroleum hydrocarbon wax composition having an ASTM melting point of about 180° F. to about 185° F., a color darker than NPA-8, an ASTM penetrometer value at 77° F. of 8-9, a flavor rating of at least 4, and substantially no acid number and saponification value, percolating 125 parts, by weight, of said melted wax composition through 2 parts, by weight, of a decolorizing clay until the color of said wax composition is reduced to NPA about 4, then blending with said wax composition a pharmaceutical grade of white petrolatum having an ASTM melting point of 115°-120° F. the weight of petrolatum being about one-fifth of the weight of the wax composition with which it is to be mixed and being effective to produce in the mixed composition upon hot stage tests as herein defined essentially no fringe of melted composition at temperatures up to about 180° F. and also upon bend tests as herein defined demonstrating at 32° F. no fracture along the outside of the bend, then percolating the resulting mixed wax composition through 3 parts, by weight, of bone black having a temperature of at least 180° F.-185° F. and just previously dehydrated at 200° F. to a moisture content of less than 2% ASTM, maintaining the wax composition in contact with the bone black at a temperature of about 210° to 220° F. and percolating the wax composition through the bone black at a rate of about 0.01725 part, by weight, per minute, then with the resulting composition heated to 215°-225° F. bubbling clean dry steam therethrough for about 2 to 3 hours at a rapid rate just below that causing foam to cover the entire wax composition surface.

7. An odor and flavor free microcrystalline petroleum hydrocarbon wax composition adapted to be used for lining metal containers, which wax composition is a blend of about 84 parts, by weight, of a microcrystalline petroleum hydrocarbon wax composition having an ASTM melting point of about 160° F. to about 250° F. and an ASTM penetrometer value of about 9 to 11 with about 16 parts, by weight, of a pharmaceutical grade of white petrolatum having an ASTM melting point of 115° F.-120° F., and which first named wax composition withstands temperatures up to 130° F. without melting and is flexible in thin films at 32° F., has substantially no acid number and saponification value, has an NPA color greater than 1, and which, even when aerated at temperatures of from about 50° F. to about 100° F. above its ASTM melting point for periods upwards of 240 hours, remains odor and flavor free.

8. An odor and flavor free microcrystalline petroleum hydrocarbon wax composition adapted to be used for lining metal containers, which wax composition is a blend of about 84 parts, by weight, of a microcrystalline petroleum hydrocarbon wax composition having an ASTM melting point of about 160° F. and an ASTM penetrometer value of about 9 to 11 with 16 parts, by weight, of a pharmaceutical grade of white petrolatum having an ASTM melting point of 115° F.-120° F., and which first named wax composition has substantially no acid number and saponification value, has an NPA color greater than 1, does not melt and soften sufficiently to form a melted fringe at 130° F., is flexible in thin films at 32° F. and which, even when aerated at temperatures of from about 50° F. to about 100° F. above its ASTM melting point for periods upwards of 240 hours, remains odor and flavor free.

CURTIS E. MAIER.
JAY D. GREEN.

REFERENCES CITED

The following references are of record in the file of this patent:

UNITED STATES PATENTS

| Number | Name | Date |
|---|---|---|
| 115,871 | Lambe | June 13, 1871 |
| 1,278,023 | Rosenbaum | Sept. 3, 1918 |
| 2,028,307 | Wiezevich | Jan. 21, 1936 |
| 2,123,982 | Wiles I | July 19, 1938 |
| 2,221,341 | Beal | Nov. 12, 1940 |
| 2,273,726 | Renshaw | Feb. 17, 1942 |
| 2,306,201 | Wiles II | Dec. 22, 1942 |
| 2,329,785 | Pool | Sept. 21, 1943 |